United States Patent
Endo et al.

(10) Patent No.: US 12,091,524 B2
(45) Date of Patent: Sep. 17, 2024

(54) METHOD FOR PRODUCING BIODEGRADABLE RESIN EXPANDED SHEET

(71) Applicant: SEKISUI KASEI CO., LTD., Osaka (JP)

(72) Inventors: Shota Endo, Osaka (JP); Eiji Fukuyama, Osaka (JP); Ayano Mori, Osaka (JP)

(73) Assignee: SEKISUI KASEI CO., LTD., Osaka (JP)

( * ) Notice: Subject to any disclaimer, the term of this patent is extended or adjusted under 35 U.S.C. 154(b) by 447 days.

(21) Appl. No.: 17/433,370

(22) PCT Filed: Mar. 25, 2020

(86) PCT No.: PCT/IB2020/052783
§ 371 (c)(1),
(2) Date: Aug. 24, 2021

(87) PCT Pub. No.: WO2020/194199
PCT Pub. Date: Oct. 1, 2020

(65) Prior Publication Data
US 2022/0169817 A1    Jun. 2, 2022

(30) Foreign Application Priority Data
Mar. 28, 2019 (JP) .................. 2019-064204

(51) Int. Cl.
*C08J 9/14* (2006.01)
*B29C 44/20* (2006.01)
(Continued)

(52) U.S. Cl.
CPC .............. *C08J 9/141* (2013.01); *B29C 44/20* (2013.01); *B29C 48/0022* (2019.02);
(Continued)

(58) Field of Classification Search
CPC ... B29C 48/885; B29C 48/0022; B29C 48/89; B29C 48/09; B29C 48/32; B29C 48/87;
(Continued)

(56) References Cited

U.S. PATENT DOCUMENTS 6,037,384 A * 3/2000 Kakizawa ............... C08J 9/00
521/182
7,265,160 B2   9/2007 Oka et al.
(Continued)

FOREIGN PATENT DOCUMENTS

| CN | 1596279 | 3/2005 |
|----|---------|--------|
| JP | 9-263651 | 10/1997 |

(Continued)

OTHER PUBLICATIONS

17433370 WO2011/013718A1 Asada et al. machine translation to English, Feb. 3, 2011 (Year: 2011).*

(Continued)

*Primary Examiner* — Galen H Hauth
*Assistant Examiner* — Lawrence D. Hohenbrink, Jr.
(74) *Attorney, Agent, or Firm* — Greenblum & Bernstein, P.L.C.

(57) ABSTRACT

The present invention relates to a method for producing a biodegradable resin expanded sheet, by which a biodegradable resin expanded sheet immediately after extrusion is brought into a predetermined cooled state in an extrusion expansion method, whereby good formability can be exerted.

3 Claims, 1 Drawing Sheet

(51) Int. Cl.
- *B29C 48/00* (2019.01)
- *B29C 48/09* (2019.01)
- *B29C 48/32* (2019.01)
- *B29C 48/87* (2019.01)
- *B29C 48/885* (2019.01)
- *B29C 48/89* (2019.01)
- *B29C 44/50* (2006.01)
- *B29C 48/10* (2019.01)
- *B29C 48/28* (2019.01)
- *B29C 48/88* (2019.01)
- *B29K 67/00* (2006.01)
- *C08K 3/34* (2006.01)
- *C08L 101/16* (2006.01)

(52) U.S. Cl.
CPC .............. *B29C 48/09* (2019.02); *B29C 48/32* (2019.02); *B29C 48/87* (2019.02); *B29C 48/885* (2019.02); *B29C 48/89* (2019.02); *B29C 44/507* (2016.11); *B29C 48/022* (2019.02); *B29C 48/10* (2019.02); *B29C 48/28* (2019.02); *B29C 48/88* (2019.02); *B29K 2067/00* (2013.01); *B29K 2067/04* (2013.01); *B29K 2995/006* (2013.01); *C08J 2201/03* (2013.01); *C08J 2367/02* (2013.01); *C08K 3/346* (2013.01); *C08L 101/16* (2013.01)

(58) Field of Classification Search
CPC ....... B29C 48/022; B29C 48/10; B29C 48/28; B29C 48/88; B29C 44/20; B29C 44/507; B29K 2067/00; B29K 2067/04; B29K 2995/006; C08J 2201/03; C08J 2367/02; C08K 3/346; C08L 101/16
USPC .......................................................... 264/54
See application file for complete search history.

(56) References Cited

U.S. PATENT DOCUMENTS

| | | | |
|---|---|---|---|
| 2007/0059511 | A1 | 3/2007 | Edwards et al. |
| 2013/0303645 | A1 | 11/2013 | Dix et al. |

FOREIGN PATENT DOCUMENTS

| | | | |
|---|---|---|---|
| JP | 2002-226690 | 8/2002 | |
| JP | 2012-211294 | 11/2012 | |
| JP | 2014-009302 | 1/2014 | |
| JP | 2014-51682 | 3/2014 | |
| JP | 2015-514027 | 5/2015 | |
| WO | 2011/013718 | 2/2011 | |
| WO | WO-2011013718 A1 * | 2/2011 | ........... B29C 44/507 |

OTHER PUBLICATIONS

International Search Report issued in International Patent Application No. PCT/IB2020/052783, dated Jun. 30, 2020, along with an English translation thereof.

Written Opinion of the International Searching Authority issued in International Patent Application No. PCT/IB2020/052783, dated Jun. 30, 2020, along with an English translation thereof.

Office Action issued for Taiwanese Patent Application No. 109109634, dated Sep. 30, 2020, along with an English language summary of the Office Action.

Notice of Allowance Issued in Corresponding Taiwanese Patent Application No. 109109634, dated Oct. 1, 2021, along with an English summary thereof.

Office Action Issued in Corresponding Chinese Patent Application No. 202080017903.4, dated Sep. 22, 2022, along with an English translation thereof.

Office Action issued in Corresponding KR Patent Application No. 10-2021-7027129, dated Mar. 12, 2024, along with an English translation thereof.

* cited by examiner

METHOD FOR PRODUCING BIODEGRADABLE RESIN EXPANDED SHEET

CROSS REFERENCE TO RELATED APPLICATION

This Application is a 371 of PCT/IB2020/052783 filed on Mar. 25, 2020, which, in turn, claimed the priority of Japanese Patent Application No. 2019-064204 filed on Mar. 28, 2019, the contents of which are incorporated herein by reference.

TECHNICAL FIELD

The present invention relates to a method for producing a biodegradable resin expanded sheet.

BACKGROUND TECHNOLOGY

Conventionally, since a resin expanded sheet is lightweight, is excellent in the cushioning property, and moreover, can be easily formed and processed into a variety of shapes, it is utilized as a raw material of various molded articles including a packaging material and the like.

In recent years, measures against a problem that the landscape is impaired by packaging materials that are illegally discarded in places such as hills and fields, rivers, and coasts are demanded.

Under such backgrounds, preparation of a molded article using a biodegradable resin that can be degraded in the natural environment is being examined, and development of a biodegradable resin expanded sheet in various applications is being examined.

For example, a resin molded article that has been processed into a three-dimensional shape by thermoforming a polylactic acid resin expanded sheet is utilized in various applications.

By the way, as a biodegradable resin used as a raw material of a resin expanded sheet, a polylactic acid resin, a polyglycolic acid resin (following Patent Document 1), and the like are known.

DOCUMENTS OF RELATED ART

Patent Document

Patent Document 1: Japanese Unexamined Patent Application, First Publication
No. 2014-009302

SUMMARY OF THE INVENTION

Problem to be Solved by the Invention

Since a biodegradable resin is configured such that, in many cases, an ester bond is introduced into a main chain so as to show hydrolyzability, a strong intermolecular force can easily work on the resin, and the resin shows crystallizability.

While the crystallizability of the biodegradable resin effectively acts in order to impart a high strength to a molded article, it may work against exertion of easy deformability, as in cases where an expanded sheet is thermally formed.

That is, when thermoforming is performed using a biodegradable resin expanded sheet, a shape of a forming die may not be reflected in a molded article with good accuracy, or even if the shape looks like a desired shape, the thickness may be ununiform.

From the above, the conventional biodegradable resin expanded sheet has a problem that it is difficult to give a predetermined shape thereto.

Therefore, an object of the present invention is to provide a biodegradable resin expanded sheet that can be easily formed into a predetermined shape.

Means for a Solving the Problem

In order to solve the above-mentioned problems, the present inventors have made intensive studies, and found out that by producing a biodegradable resin expanded sheet by a predetermined producing method, the problems as described above are solved, resulting in completion of the present invention.

That is, the present invention for solving the above-mentioned problems is a method for producing a biodegradable resin expanded sheet, the method comprising:
an extrusion expansion step of melting and kneading a resin composition containing a biodegradable resin and a blowing agent with an extruder, and extrusion expanding the melted and kneaded resin composition in a molten state from a circular die having an annular discharge port to form a cylindrical expanded sheet;
a diameter enlarging step of sliding-contacting an external peripheral surface of a cooling mandrel having a diameter larger than that of the discharge port on an internal surface of the cylindrical expanded sheet to cool the cylindrical expanded sheet from an internal side while enlarging a diameter thereof; and
a developing step of cutting the cylindrical expanded sheet that has been subjected to diameter enlargement in the diameter enlarging step along an extrusion direction to develop the cylindrical expanded sheet, to obtain a flat belt-like expanded sheet,
wherein the cylindrical expanded sheet is cooled so that a temperature of an external surface of the cylindrical expanded sheet at a position at which 5 seconds have elapsed after being discharged from the discharge port becomes 50° C. or higher and 70° C. or lower.

Effects of Invention

According to the present invention, a biodegradable resin expanded sheet that can be easily formed into a predetermined shape can be provided.

BEST MODE FOR CARRYING OUT THE INVENTION

Embodiments of the present invention will be described below.

First, extrusion equipment used in the method for producing a biodegradable resin expanded sheet of the present embodiment will be described.

Figure 1:
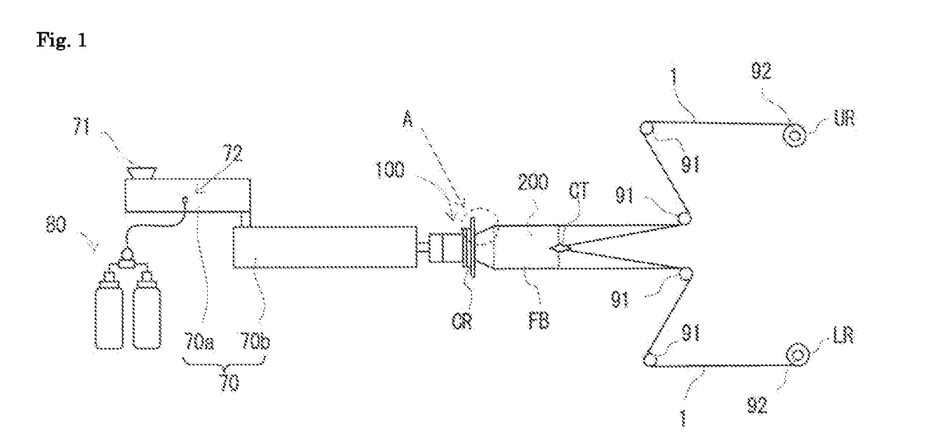
FIG. 1 is a schematic view showing a configuration of an apparatus for producing a biodegradable resin expanded sheet.
Figure 2:
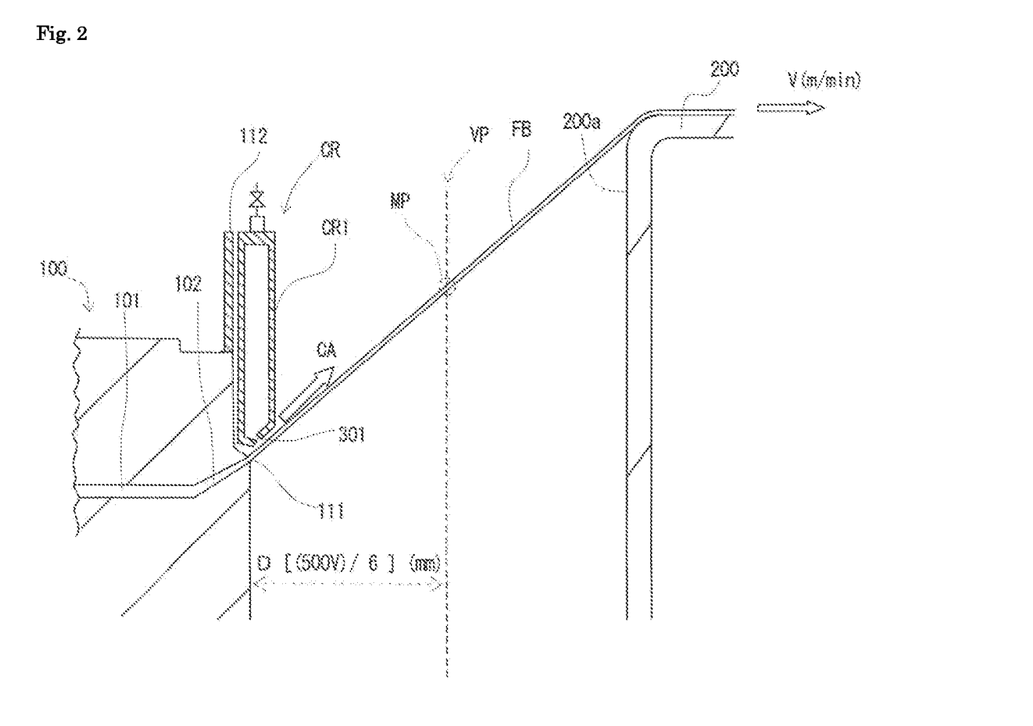
FIG. 2 is a schematic end view showing a part shown with a broken line A in FIG. 1.

FIG. 1 is a view showing a configuration of extrusion equipment, and FIG. 2 is an end view of an area shown with a broken line A in FIG. 1.

As shown in FIGS. 1 and 2, in the method for producing a biodegradable resin expanded sheet of the present embodiment, extrusion equipment provided with a tandem extruder 70 as an extruder for melting and kneading a resin composition containing a biodegradable resin and a blowing agent is used.

At a tip part of the tandem extruder 70, a circular die 100 having an annular discharge port (hereinafter, also referred to as "die slit 111") for extrusion expanding the above-mentioned resin composition in the molten state obtained by the above-mentioned melting and kneading into the atmospheric air to form a cylindrical expanded sheet FB is mounted.

The above-mentioned extrusion equipment is provided with a cooling mandrel 200 for cooling, from an internal surface side, the above-mentioned cylindrical expanded sheet FB that has been discharged in a cylindrical shape from the above-mentioned annular die slit 111 opening on a front surface of the circular die 100.

The above-mentioned extrusion equipment is further provided with a cooling device CR for cooling the above-mentioned cylindrical expanded sheet from an external side by blowing wind, to an expanded sheet (cylindrical expanded sheet) before being cooled with the above-mentioned cooling mandrel 200, from an external side.

The above-mentioned tandem extruder 70 is configured such that two extruders of an upstream extruder 70a and a downstream extruder 70b are connected, and the upstream extruder 70a is provided with a hopper 71 for putting a forming material of a biodegradable resin expanded sheet, and a gas introduction part 72 for supplying a blowing agent such as a hydrocarbon from a gas supply device 80 into a cylinder.

In addition, the downstream extruder 70b is mounted with the above-mentioned circular die 100 in which an annular die slit 111 is formed.

The above-mentioned circular die 100 has a cylindrical first internal flow channel 101 that is formed as a passage of the above-mentioned resin composition in the molten state, which has been kneaded in the above-mentioned downstream extruder 70b, and a second internal flow channel 102 subsequent to the first internal flow channel 101.

The above-mentioned first internal flow channel 101 has a diameter smaller than that of the above-mentioned die slit 111, the above-mentioned second internal flow channel 102 flares outward from an end of the above-mentioned first internal flow channel 101, and at an end thereof, the above-mentioned die slit 111 is formed.

The above-mentioned circular die 100 is configured to extrude the resin composition melted and kneaded with an extruder in the expanded state, toward a cooling mandrel 200 disposed in front thereof, and the above-mentioned mandrel 200 has a cylindrical shape having a diameter larger than that of the above-mentioned circular die 100, and is mounted so as to sliding-contact its external peripheral surface on an internal surface of a cylindrical expanded sheet FB extruded from the circular die 100, to cool the cylindrical expanded sheet FB from an internal side.

The above-mentioned circular die 100 and the above-mentioned cooling mandrel 200 are mounted so that a center of the annular die slit 111 opening on a front surface of the circular die 100 is positioned on an extended line formed by extending a central axis of a cylindrical shape of the cooling mandrel 200.

Thereby, the extrusion equipment of the present embodiment is configured such that a diameter of the cylindrical expanded sheet FB from the circular die 100 to the cooling mandrel 200 is approximately evenly enlarged from the circular die 100 toward the cooling mandrel 200.

On a downstream side of the above-mentioned cooling mandrel 200, a cutting blade CT for making one left and right pair of notches on the cylindrical expanded sheet FB is attached.

The extrusion equipment in the present embodiment is provided with a roller 91 for developing cylindrical expanded sheets FB that have been split into two upper and lower parts by cutting with the above-mentioned cutting blade CT along an extrusion direction, into flat sheets, respectively, and a wind-up roller 92 for winding this developed biodegradable resin expanded sheet 1 as two web rolls of an upper roll UR and a lower roll LR.

In the present embodiment, the above-mentioned cooling device CR for cooling the above-mentioned cylindrical expanded sheet FB from an external side, from the above-mentioned circular die 100 to the above-mentioned cooling mandrel 200, has a cooling ring CR1 that is a flat doughnut-like hollow plate.

In the cooling ring CR1, the internal circumference thereof is a round shape having a slightly larger diameter than that of the above-mentioned die slit 111, a blowout port 301 for blowing out air is formed on an internal circumferential part, and the blowout port 301 is formed annularly along an internal circumferential edge of the above-mentioned cooling ring CR1.

In the cooling ring CR1, since the blowout port 301 is opened along an internal circumference as described above, the blowout port 301 is opened on an external side of the above-mentioned die slit 111 spaced apart by a slight distance, and the above-mentioned cooling mechanism is configured so as to blow wind to a cylindrical expanded sheet FB immediately after being extruded.

When a biodegradable resin expanded sheet is produced using the extrusion equipment as described above, (A) an extrusion expansion step of melting and kneading a resin composition containing a biodegradable resin and a blowing agent with the above-mentioned tandem extruder 70, and extrusion expanding the above-mentioned melted and kneaded resin composition in the molten state from the above-mentioned die slit 111 of a circular die 100 to form a cylindrical expanded sheet FB, (B) a diameter enlarging step of sliding-contacting an external peripheral surface of a cooling mandrel 200 having a larger diameter than that of the above-mentioned die slit 111 on an internal surface of the above-mentioned cylindrical expanded sheet FB to cool the above-mentioned expanded sheet FB from an internal side while enlarging a diameter thereof, and (C) a developing step of cutting the cylindrical expanded sheet FB that has been subjected to diameter enlargement in the diameter enlarging step with the above-mentioned cutting blade CT along an extrusion direction, to develop the cylindrical expanded sheet FB with the above-mentioned roller 91, to obtain a flat belt-like expanded sheet, are performed to produce a biodegradable resin expanded sheet 1 having the monolayer structure.

In the present embodiment, the above-mentioned cylindrical expanded sheet FB is strongly cooled with the above-mentioned cooling ring CR1.

Specifically, in the present embodiment, employing the above-mentioned cooling ring CR1, the above-mentioned cylindrical expanded sheet FB is cooled so that a temperature of an external surface of the above-mentioned cylindrical expanded sheet FB at a position at which 5 seconds have elapsed after being discharged from the above-mentioned discharge port becomes 50° C. or higher and 70° C. or lower.

Herein, a temperature of an external surface of the cylindrical expanded sheet FB is measured with a contactless thermometer.

In addition, a take-off speed of a biodegradable resin expanded sheet 1 with the above-mentioned wind-up roller 92 is V (m/min), it is preferable that also during enlargement of a diameter of a cylindrical expanded sheet FB from a die slit 111 to a front end of a cooling mandrel 200, a moving speed in a horizontal direction is the same V (m/min) as the take-off speed.

Accordingly, a position at the elapsed time t (second) after being discharged from the above-mentioned discharge port can be regarded as a point that is apart from a die slit 111 by the following distance D (mm) in the horizontal direction.

$$D(mm)=(1{,}000 \times V \times t)/60$$

That is, "a position at which 5 seconds have elapsed after being discharged from a discharge port" means a position at which a virtual plane VP parallel with the above-mentioned die slit 111 spaced apart from the above-mentioned die slit 111 in the horizontal direction by a distance "500 V/6 (mm)" intersects with the above-mentioned cylindrical expanded sheet FB.

Accordingly, "a temperature at a position at which 5 seconds have elapsed after being discharged from a discharge port" can be measured by setting a point on a circumference formed by the intersection of the above-mentioned virtual plane VP and an external surface of the above-mentioned cylindrical expanded sheet FB, at a measurement point MP.

The above-mentioned temperature can be obtained, specifically, by measuring a surface temperature on the above-mentioned circumference at 4 places that are each shifted by about 90 degrees up and down, left and right, and calculating an arithmetic average of 4 measured values.

Measurement may be performed, for example, at a distance about 5 cm apart from a biodegradable resin expanded sheet, by setting the emissivity of 1.0, using an infrared thermometer (for example, stock number "ST653" manufactured by AS ONE Corporation).

In addition, since the cylindrical expanded sheet FB is rapidly cooled with the above-mentioned cooling ring CR at an early stage immediately after extrusion, expansion can easily become insufficient, as compared with the case where an extrusion expansion step is performed under the normal conditions.

In order to prevent this, it is preferable that when melting and kneading are performed with an extruder, quite a lot of blowing agent is incorporated.

In addition, the above-mentioned temperature at a position at which 5 seconds have elapsed after being discharged from a discharge port is preferably 55° C. or higher, more preferably 60° C. or higher.

Since the biodegradable resin expanded sheet 1 produced as described above is brought into the state where crystallization of a biodegradable resin is suppressed, when a three-dimensional shape is given by thermoforming or the like, good formability is exerted.

A thickness of the biodegradable resin expanded sheet is preferably 0.2 mm or more, more preferably 0.5 mm or more, further preferably 1.0 mm or more.

The thickness of the above-mentioned biodegradable resin expanded sheet is preferably 6 mm or less, more preferably 5 mm or less, further preferably 4 mm or less.

The thickness of the above-mentioned biodegradable resin expanded sheet can be obtained, for example, as an average of thicknesses measured at measurement points of randomly selected 10 or more places.

A basis weight of the above-mentioned biodegradable resin expanded sheet is preferably 200 g/m$^2$ or more, more preferably 250 g/m$^2$ or more, further preferably 300 g/m$^2$ or more.

The basis weight of the above-mentioned biodegradable resin expanded sheet is preferably 750 g/m$^2$ or less, more preferably 650 g/m$^2$ or less.

The basis weight of the above-mentioned biodegradable resin expanded sheet is obtained, for example, by the equation below, by excising a plurality of (for example, 10) samples of 100 cm$^2$ or more, and measuring the mass and the area of each of the samples.

$$\text{Basis weight } (g/m^2)=10{,}000 \times \text{test piece mass (g)/test piece area (cm}^2\text{)}$$

The density (apparent density) of the biodegradable resin expanded sheet as described above is not particularly limited, but is preferably 150 kg/m$^3$ or more, more preferably 200 kg/m$^3$ or more.

The apparent density is preferably 1,000 kg/m$^3$ or less, more preferably 800 kg/m$^3$ or less, further preferably 600 kg/m$^3$ or less.

The apparent density of the biodegradable resin expanded sheet can be obtained by a method described in JIS K7222: 1999 "Cellular plastics and rubbers—Determination of apparent density", and specifically, is measured by the method as described below.

(Method of Measuring Apparent Density)

A sample of 100 cm$^3$ or more is cut from the biodegradable resin expanded sheet so as not to change the original cell structure, this sample is conditioned for 16 hours under the standard atmosphere of JIS K7100: 1999, symbol "23/50" (temperature 23° C., relative humidity 50%), class 2, thereafter, the dimension and the mass thereof are measured, and the density is calculated by the following equation:

$$\text{Apparent density } (kg/m^3)=\text{mass of sample (kg)/volume of sample } (m^3)$$

In addition, for measuring the dimension of the sample, for example, "DIGIMATIC" type CD-15 manufactured by Mitutoyo Corporation can be used.

In order to exert good formability, in the above-mentioned biodegradable resin expanded sheet, an open cell ratio is preferably 25% or less, more preferably 20% or less, further preferably 15% or less.

The open cell ratio is usually 1% or more.

An open cell ratio of the above-mentioned biodegradable resin expanded sheet is measured as follows:

<Open Cell Ratio of Biodegradable Resin Expanded Sheet>

A plurality of 25 mm length and 25 mm width sheet-like samples are excised from the biodegradable resin expanded sheet, excised samples are overlapped so as not to form gaps to obtain a measurement sample having a thickness of 25 mm, the external dimension of this measurement sample is measured to 1/100 mm using "DIGIMATIC CALIPER" manufactured by Mitutoyo Corporation, and an apparent volume (cm$^3$) is obtained.

Then, the volume (cm³) of the measurement sample is obtained by the 1½-1 atm method using an air comparison pycnometer type 1000 (manufactured by Tokyo Science Co., Ltd.).

By these obtained values and the following equation, an open cell ratio (%) is calculated, and an average of the number of tests (5 times) is obtained.

In addition, after the measurement sample is conditioned for 16 hours under the standard atmosphere of JIS K7100-1999, symbol "23/50" (temperature 23° C., relative humidity 50%), class 2, measurement is performed under the same standard atmosphere.

In addition, the air comparison pycnometer is corrected with a standard sphere (large 28.9 cc, small 8.5 cc).

Open cell ratio (%)=(apparent volume−volume measured with air comparison pycnometer)/apparent volume×100

When the above-mentioned biodegradable resin expanded sheet shows excessive adherability to the surface of a forming die (forming surface), it becomes difficult to slide on a forming surface, and conversely, this can also be a main cause for reducing the formability.

At such a point, in the biodegradable resin expanded sheet, the surface roughness (Ra) on at least one side is preferably 3 μm or more, and it is more preferable that the surface roughness (Ra) of both surfaces is 3 μm or more.

The above-mentioned surface roughness (Ra) is preferably 6 μm or less, more preferably 5 μm or less.

The surface roughness (arithmetic average roughness: Ra) of the above-mentioned biodegradable resin expanded sheet is measured in accordance with JIS B0601 "Definitions and Indications of Surface Roughness".

That is, after the biodegradable resin expanded sheet is conditioned for 16 hours under the standard atmosphere of JIS K7100: 1999, symbol "23/50" (temperature 23° C., relative humidity 50%), class 2, the surface roughness is measured under the following device and measurement conditions.

(Measurement Conditions)
Device: HANDYSURF E-35A manufactured by TOKYO SEIMITSU CO., LTD.
Cutoff value (λc): 0.80 mm
Assessment length (L): 4.0 mm In addition, measurement is performed five times in each of TD directions (direction orthogonal to extrusion direction, width direction) of surface and back both sides of the biodegradable resin expanded sheet, respectively, and an average of arithmetic average roughness Ra of those respective sides is employed as the surface roughness in each side of the expanded sheet.

An average cell diameter of the above-mentioned biodegradable resin expanded sheet is preferably 0.6 mm or less, more preferably 0.5 mm or less.

The above-mentioned average cell diameter is usually 0.05 mm or more.

An average cell diameter of the above-mentioned biodegradable resin expanded sheet is measured as described below.

<Average Cell Diameter of Biodegradable Resin Expanded Sheet>

A cross section that has been excised vertical to the surface of the biodegradable resin expanded sheet along an MD direction (extrusion direction) and a TD direction (width direction) from a width direction central part of the biodegradable resin expanded sheet is magnified to 100 times, and photographed using a scanning electron microscope "SU1510" manufactured by Hitachi High-Technologies Corporation.

Thereupon, a microscopic image is photographed so that a predetermined magnification is obtained when printed on one A4 landscape format paper in the state where two longitudinal and transverse images (total 4 images) are arranged.

Specifically, a photographing magnification with an electron microscope is adjusted so that when a 60 mm arbitrary straight line parallel with each direction of MD and TD, and a 60 mm straight line in a direction orthogonal to each direction (thickness direction, also referred to as VD direction) are drawn on the image printed as described above, the number of cells present on this straight line becomes around 3 to 10.

For each of a cross section that has been cut along the MD direction (hereinafter, referred to as "MD cross section") and a cross section that has been cut along the TD direction (hereinafter, referred to as "TD cross section"), microscopic images of each two fields, a total of 4 fields, are photographed and printed on an A4 paper as described above.

Three arbitrary straight lines (length 60 mm) parallel with the MD direction are drawn on each of two images of the MD cross section, and at the same time, three arbitrary straight lines (length 60 mm) parallel with the TD direction are drawn on each of two images of the TD cross section.

In addition, three straight lines (60 mm) parallel with the VD direction are drawn on one image of the MD cross section and one image of the TD cross section, and every six 60 mm arbitrary straight lines parallel with the MD direction, the TD direction, and the VD direction are drawn for every direction.

In addition, arbitrary straight lines are such that a cell is contacted only at a contact point as less as possible, and when contacted, this cell is also added as the cell number.

Cell numbers D counted regarding six arbitrary straight lines for each direction of the MD direction, the TD direction, and the VD direction are arithmetically averaged, and this is employed as the cell number for each direction.

From an image magnification at which the cell number was counted, and this cell number, an average chord length t of a cell is calculated by the following equation:

$$\text{Average chord length } t \text{ (mm)} = 60/(\text{cell number} \times \text{image magnification})$$

A scale bar on an image is measured to 1/100 mm with "DIGIMATIC CALIPER" manufactured by Mitutoyo Corporation, and an image magnification is obtained by the following equation:

$$\text{Image magnification} = \text{scale bar experimental value (mm)/indicated value of scale bar (mm)}$$

Then, a cell diameter in each direction is calculated by the following equation:

$$\text{Cell diameter } D \text{ (mm)} = t/0.616$$

Further, a cubic root of a product of these values is employed as an average cell diameter.

$$\text{Average cell diameter (mm)} = (D_{MD} \times D_{TD} \times D_{VD})^{1/3}$$

$D_{MD}$: cell diameter in MD direction (mm)
$D_{TD}$: cell diameter in TD direction (mm)
$D_{VD}$: cell diameter in VD direction (mm)

The biodegradable resin expanded sheet of the present embodiment is manufactured by melting and kneading a resin composition containing a biodegradable resin as a main component together with a blowing agent with an extruder, and thereafter, extruding the kneading product into the atmospheric air through a die attached to a tip of the extruder, as described above.

The above-mentioned resin composition of the present embodiment may contain an additive described later and the like, in addition to the biodegradable resin.

Examples of the biodegradable resin of the present embodiment include a biodegradable polyester-based resin.

Examples of the biodegradable polyester-based resin include, for example, an aliphatic polyester-based resin obtained by polycondensation of glycol and aliphatic dicarboxylic acid and the like, and a resin containing dicarboxylic acid and diol as a constituent unit is preferable.

Examples of the aliphatic polyester-based resin include, for example, polyethylene succinate, polybutylene succinate, polyhexamethylene succinate, polyethylene adipate, polyhexamethylene adipate, polybutylene adipate, polyethylene oxalate, polybutylene oxalate, polyneopentyl oxalate, polyethylene sebacate, polybutylene sebacate, polyhexamethylene sebacate, polybutylene succinate adipate, polybutylene succinate carbonate, and the like.

The biodegradable polyester-based resin of the present embodiment may be, for example, an aliphatic polyester-based resin such as poly($\alpha$-hydroxyacid) such as polyglycolic acid and polylactic acid, or a copolymer thereof, poly($\Omega$-hydroxyalkanoate) such as poly($\varepsilon$-caprolactone) and poly($\beta$-propiolactone), poly($\beta$-hydroxyalkanoate) such as poly(3-hydroxybutyrate), poly(3-hydroxyvalerate), poly(3-hydroxycaproate), poly(3-hydroxyheptanoate), and poly(3-hydroxyoctanoate), and poly(4-hydroxybutyrate).

If necessary, the above-mentioned biodegradable polyester-based resin may be subjected to modification for forming a branch structure and a crosslinked structure.

For introducing the branch structure and the crosslinked structure into the biodegradable polyester-based resin, a chain extender such as carbodiimide can be used.

Modification with a chain extender can be performed using a compound having one or a plurality of functional groups that can condense with a hydroxy group or a carboxyl group present in the molecular structure of the biodegradable polyester-based resin, such as an acrylic-based organic compound, an epoxy-based organic compound, and an isocyanate-based organic compound.

That is, the above-mentioned modification can be carried out by a method of binding an acrylic-based organic compound, an epoxy-based organic compound, an isocyanate-based organic compound or the like to the biodegradable polyester-based resin by a reaction.

Modification of the biodegradable polyester-based resin with the crosslinked structure or the branch structure can be performed, for example, by a method of reacting biodegradable polyester-based resin molecules together by a radical initiator.

Such a reaction can be performed using an extruder such as a twin screw extruder.

Among the above-mentioned modification methods, it is preferable to react biodegradable polyester-based resin molecules together by a radical initiator, in that inclusion of other components after modification can be suppressed.

In addition, when biodegradable polyester-based resin molecules are reacted together using a radical initiator having a suitable reactivity, a degradation starting point of the biodegradable polyester-based resin in the extruder is attacked by a free radical generated by the above-mentioned radical initiator, the place becomes a crosslinked point (branching point), and the resin is stabilized.

In the biodegradable polyester-based resin, the thermal stability is increased by such modification, and reduction in molecular weight becomes difficult when the resin passes through the extruder.

Examples of the above-mentioned radical initiator include, for example, organic peroxides, azo compounds, halogen molecules, and the like.

Among these, an organic peroxide is preferable.

Examples of the organic peroxide used in the present embodiment include, for example, peroxyester, hydroperoxide, dialkyl peroxide, diacyl peroxide, peroxydicarbonate, peroxyketal, ketone peroxide, and the like.

Examples of the above-mentioned peroxyester include, for example, t-butylperoxy 2-ethylhexyl carbonate, t-hexylperoxy isopropyl monocarbonate, t-hexyl peroxybenzoate, t-butyl peroxybenzoate, t-butyl peroxylaurate, t-butyl peroxy-3,5,5-trimethylhexanoate, t-butyl peroxyacetate, 2,5-dimethyl-2,5-di(benzoylperoxy)hexane, t-butyl peroxyisopropyl monocarbonate, and the like.

Examples of the above-mentioned hydroperoxide include, for example, permethane hydroperoxide, diisopropylbenzene hydroperoxide, cumene hydroperoxide, t-butyl hydroperoxide, and the like.

Examples of the above-mentioned dialkyl peroxide include, for example, dicumyl peroxide, di-t-butyl peroxide, 2,5-dimethyl-2,5-di(t-butylperoxy)hexyne-3, and the like.

Examples of the above-mentioned diacyl peroxide include, for example, dibenzoyl peroxide, di(4-methylbenzoyl) peroxide, di(3-methylbenzoyl) peroxide, and the like.

Examples of the above-mentioned peroxydicarbonate include, for example, di(2-ethylhexyl) peroxydicarbonate, diisopropyl peroxydicarbonate and the like.

Examples of the above-mentioned peroxyketal include, for example, 1,1-di-t-butylperoxy-3,3,5-trimethylcyclohexane, 1,1-di-t-butylperoxycyclohexane, 2,2-di(t-butylperoxy)butane, n-butyl 4,4-di-(t-butylperoxy)valerate, 2,2-bis(4,4-di-t-butylperoxycyclohexyl)propane, and the like.

Examples of the above-mentioned ketone peroxide include, for example, methyl ethyl ketone peroxide, acetylacetone peroxide, and the like.

The above-mentioned organic peroxide is preferably peroxyester.

In addition, it is preferable that the organic peroxide used in modification of the biodegradable polyester-based resin is a peroxycarbonate-based organic peroxide, among peroxyesters.

Among peroxycarbonate-based organic peroxides, an organic peroxide used in modification of the biodegradable polyester-based resin in the present embodiment is preferably peroxymonocarbonate-based organic peroxide, particularly preferably t-butylperoxyisopropyl monocarbonate.

The organic peroxide as described above is usually used at the content of 0.1 part by mass or more, based on 100 parts by mass of the biodegradable polyester-based resin to be modified, depending on a molecular weight thereof.

The content of the above-mentioned organic peroxide is preferably 0.2 part by mass or more, particularly preferably 0.3 part by mass or more.

The content of the above-mentioned organic peroxide is preferably 2.0 parts by mass or less, more preferably 1.5 parts by mass or less, particularly preferably 1.0 part by mass or less.

By modifying the biodegradable polyester-based resin using the organic peroxide at such a content, the biodegradable polyester-based resin after modification can be made to be suitable for expansion.

The organic peroxide as described above can more reliably exert the effect due to modification on the biodegradable polyester-based resin, by using the content thereof of 0.1 part by mass or more.

On the other hand, the organic peroxide can inhibit interminglement of much gel in the biodegradable polyester-based resin after modification, by using the content thereof of 2.0 parts by mass or less.

As the above-mentioned biodegradable polyester-based resin, one having no long chain branch is preferable.

From a view point of biodegradability, the biodegradable polyester-based resin of the present embodiment is preferably an aliphatic polyester-based resin.

When an amount of all biodegradable polyester-based resins contained in the above-mentioned resin composition is 100% by mass, a ratio of the aliphatic polyester-based resin is preferably 85% by mass or more, more preferably 90% by mass or more, further preferably 95% by mass or more.

It is especially preferable that all biodegradable polyester-based resins contained in the above-mentioned resin composition are an aliphatic polyester-based resin.

Among these, the biodegradable polyester-based resin used in the present embodiment is particularly preferably polybutylene succinate.

When an amount of all biodegradable polyester-based resins contained in the above-mentioned resin composition is 100% by mass, a ratio of polybutylene succinate is preferably 85% by mass or more, more preferably 90% by mass or more, further preferably 95% by mass or more.

It is especially preferable that all biodegradable polyester-based resins contained in the above-mentioned resin composition are polybutylene succinate.

In addition, in the present embodiment, among the above-exemplified biodegradable aliphatic polyester-based resins, one kind may be used by selecting it, and among the above-exemplified biodegradable aliphatic polyester-based resins, a plurality of kinds may be used by mixing them, and a biodegradable aliphatic polyester-based resin other than the above-mentioned exemplified ones may be used.

Examples of an additive contained in the above-mentioned resin composition include polymers other than a biodegradable resin, inorganic substances such as an inorganic filler, various rubber-plastic chemicals, and the like.

Examples of the polymer other than the above-mentioned biodegradable resin, which can be contained in the above-mentioned resin composition, include polymer antistatic agents, fluorine-based resins used as a cell adjusting agent, rubber-based modifiers, and the like.

In order to make the biodegradable resin expanded sheet exert excellent biodegradability, a ratio of the biodegradable resin occupied in all polymers contained in the resin composition is preferably 85% by mass or more, more preferably 90% by mass or more, further preferably 95% by mass or more.

In order to make the biodegradable resin expanded sheet exert good biodegradability, a ratio of the biodegradable polyester-based resin occupied in all biodegradable resins contained in the resin composition is preferably 85% by mass or more, more preferably 90% by mass or more, further preferably 95% by mass or more.

The above-mentioned resin composition can arbitrarily contain an additive such as a shrinkage preventing agent for the purpose of further improving the expansion formability thereof.

It is preferable that the content of the additive is in a range of 0.05 part by mass or more and 5 parts by mass or less, based on 100 parts by mass of the biodegradable resin.

Examples of the above-mentioned shrinkage preventing agent include, for example, higher alkylamine, fatty acid amide, a complete ester of higher fatty acid, and the like, in addition to ester compounds of a polyhydric alcohol and a higher fatty acid such as lauric acid monoglyceride, palmitic acid monoglyceride, stearic acid monoglyceride, pentaerythrite monocaprate, pentaerythrite monooleate, pentaerythrite monolaurate, dipentaerythrite distearate, sorbitan monooleate, sorbitan sesquisaccharide oil fatty acid ester, sorbitan monopalmitate, sorbitan monolaurate, sorbitan monostearate, mannitan monooleate, and mannitan monolaurate.

As the shrinkage preventing agent, among the above-exemplified ones, one kind may be used by selecting it, among the above-exemplified shrinkage preventing agents, a plurality of kinds may be used by mixing them, and as the shrinkage preventing agent other than the above-mentioned exemplified ones, the known one may be used.

Among them, stearic acid monoglyceride is particularly preferable.

In the above-mentioned resin composition, a generally used cell adjusting agent can be used, for the purpose of forming a good cell structure at expansion.

Examples of the cell adjusting agent include, for example, a fine powder of a fluorine-based resin such as polytetrafluoroethylene, talc, aluminum hydroxide, silica, and the like.

A decomposable blowing agent that will be further described later can adjust the expanded state by joint use with a volatile blowing agent, and can also be used as a cell adjusting agent.

A blowing agent used in the above-mentioned resin composition is not particularly limited as long as it is used in normal extrusion expansion, a volatile blowing agent that becomes a gas at an ambient temperature (23° C.) and an ambient pressure (1 atm), and a decomposable blowing agent that generates the gas by thermal decomposition can be employed, and as the above-mentioned volatile blowing agent, for example, an inert gas, an aliphatic hydrocarbon, an alicyclic hydrocarbon, and the like can be employed.

Examples of the above-mentioned inert gas include, for example, carbon dioxide, nitrogen, and the like, examples of the aliphatic hydrocarbon include for example, propane, normal butane, isobutane, normal pentane, isopentane, and the like, and examples of the above-mentioned alicyclic hydrocarbon include, for example, cyclopentane. cyclohexane, and the like.

The content of the above-mentioned blowing agent is preferably 0.1 part by mass or more, more preferably 0.3 part by mass or more, particularly preferably 0.6 part by mass or more, based on 100 parts by mass of the biodegradable resin contained in the above-mentioned resin composition.

The content of the above-mentioned blowing agent is preferably 2 parts by mass or less, more preferably 1.5 parts by mass or less, further preferably 1.2 parts by mass or less.

Examples of the above-mentioned decomposable blowing agent include azodicarbonamide, dinitrosopentamethylenetetramine, sodium bicarbonate, or a mixture of an organic acid such as citric acid or a salt thereof and a bicarbonate salt, and the like.

In the resin composition to be supplied to extrusion expansion, a crystal nucleating agent and a crystallization accelerator may be contained, together with the above-mentioned biodegradable resin.

Examples of the above-mentioned crystal nucleating agent include, for example, an organic crystal nucleating agent and an inorganic crystal nucleating agent.

As the above-mentioned crystal nucleating agent, only one of the organic crystal nucleating agent and the inorganic crystal nucleating agent may be employed, or the organic crystal nucleating agent and the inorganic crystal nucleating agent may be used together.

In addition, when only the inorganic crystal nucleating agent is used as the above-mentioned crystal nucleating agent, among inorganic crystal nucleating agents listed later, only one kind may be employed, or two or more kinds may be used together.

Similarly, when only the organic crystal nucleating agent is used as the above-mentioned crystal nucleating agent, among organic crystal nucleating agents listed later, only one kind may be employed, or two or more kinds may be used together.

As the above-mentioned crystal nucleating agent, when the organic crystal nucleating agent and the inorganic crystal nucleating agent are used together, a plurality of kinds may be employed in any one of or both of the organic crystal nucleating agent and the inorganic crystal nucleating agent.

Examples of the above-mentioned inorganic crystal nucleating agent include, for example, talc, tin oxide, smectite, bentonite, dolomite, sericite, feldspar powder, kaolin, mica, montmorillonite, and the like.

From a view point of improvement in a crystallization rate, the heat resistance, the durability, and the like, it is preferable that, among these, the above-mentioned inorganic crystal nucleating agent is talc or tin oxide.

Examples of the above-mentioned organic crystal nucleating agent include, for example, organic amide compounds, organic hydrazide compounds, carboxylic acid ester-based compounds, organic sulfonic acid salts, phthalocyanine-based compounds, melamine-based compounds, organic phosphonic acid salts, and the like.

As the organic sulfonic acid salt, various organic sulfonic acid salts such as a sulfoisophthalic acid salt can be used, and among them, a dimethyl 5-sulfoisophthalate metal salt is preferable, from a view point of a crystallization promoting effect.

Further, a barium salt, a calcium salt, a strontium salt, a potassium salt, a rubidium salt, a sodium salt, and the like are preferable.

Examples of the above-mentioned organic amide compound include, for example, N,N',N''-tricyclohexyltrimesic acid amide, N,N'-ethylenebis(12-hydroxystearic acid) amide, and the like.

The content of the above-mentioned crystal nucleating agent in the above-mentioned resin composition can be, for example, 0.5 part by mass or more, when the content of the above-mentioned biodegradable resin contained in the above-mentioned resin composition is 100 parts by mass.

The content of the above-mentioned crystal nucleating agent in the above-mentioned resin composition is preferably 0.6 part by mass or more, more preferably 0.7 part by mass or more.

The content of the above-mentioned crystal nucleating agent in the above-mentioned resin composition can be, for example, less than 3.0 parts by mass, when the content of the above-mentioned biodegradable resin contained in the above-mentioned resin composition is 100 parts by mass.

The content of the above-mentioned crystal nucleating agent in the above-mentioned resin composition is preferably 2.5 parts by mass or less, more preferably 2.2 parts by mass or less.

Examples of the above-mentioned crystallization accelerator include, for example, phthalic acid derivatives such as di-n-octyl phthalate, di-2-ethylhexyl phthalate, dibenzyl phthalate, diisodecyl phthalate, ditridecyl phthalate, and diundecyl phthalate, isophthalic acid derivatives such as dioctyl isophthalate, adipic acid derivatives such as di-n-butyl adipate and dioctyl adipate, maleic acid derivatives such as di-n-butyl maleate, citric acid derivatives such as tri-n-butyl citrate, itaconic acid derivatives such as monobutyl itaconate, oleic acid derivatives such as butyl oleate, ricinoleic acid derivatives such as glycerin monoricinoleate, phosphoric acid esters such as tricresyl phosphate and trixylenyl phosphate, hydroxy polycarboxylic acid esters such as polyethylene adipate and tributyl polyacrylate acetylcitrate, polyhydric alcohol esters such as glycerin triacetate and glycerin tripropionate, polyalkylene glycol derivatives such as polyethylene glycol and polypropylene glycol, benzyl 2-(2-methoxyethoxy)ethyl adipate, polyglycerin fatty acid ester, and the like.

As the above-mentioned crystallization accelerator, polyglycerin fatty acid ester is preferable.

Examples of the above-mentioned polyglycerin fatty acid esters include, for example, polyglycerin oleic acid ester, polyglycerin ricinoleic acid ester, polyglycerin lauric acid ester, polyglycerin stearic acid ester, polyglycerin condensed ricinoleic acid ester, and the like.

As the above-mentioned crystallization accelerator, among these, it is preferable to employ polyglycerin stearic acid ester.

When the content of the above-mentioned biodegradable resin contained in the above-mentioned resin composition is 100 parts by mass, the content of the above-mentioned crystallization accelerator in the above-mentioned resin composition can be, for example, 0.5 part by mass or more.

The content of the above-mentioned crystallization accelerator in the above-mentioned resin composition is preferably 0.6 part by mass or more, more preferably 0.7 part by mass or more.

When the content of the above-mentioned biodegradable resin contained in the above-mentioned resin composition is 100 parts by mass, the content of the above-mentioned crystallization accelerator in the above-mentioned resin composition can be, for example, less than 5.0 parts by mass.

The content of the above-mentioned crystallization accelerator in the above-mentioned resin composition is preferably 4.0 parts by mass or less, more preferably 3.5 parts by mass or less.

Examples of the above-mentioned additive that can be contained in the above-mentioned resin composition include, for example, lubricants, antioxidants, antistatic agents, flame retardants, ultraviolet absorbing agents, light stabilizers, coloring agents, inorganic fillers, and the like.

Besides, the above-mentioned resin composition can appropriately contain additives other than these.

In addition, the present invention is not limited to the previously stated exemplifications at all, and the above-mentioned exemplifications can be appropriately modified.

EXAMPLES

The present invention will be more specifically described below by way of Examples, but the present invention is not at all limited to the following exemplifications.

Example 1

100 parts by mass of a biodegradable polyester-based resin (manufactured by PTT MCC Biochem Company, product name "BioPBS FZ91PM") and 1.0 part by mass of a cell adjusting agent ("CROWN TALC" manufactured by Matsumura Sangyo Co., Ltd.) were dry-blended to prepare a resin composition for preparing a biodegradable resin expanded sheet.

In a tandem extruder including a first extruder having a caliber of 50 mm (upstream side) and a second extruder having a caliber of 65 mm (downstream side), the resulting resin composition was supplied to the first extruder having a caliber of 50 mm through a hopper, and heated and melted.

Thereafter, as a blowing agent, 0.8% by mass of isobutane was pressed into the first extruder, and melted and kneaded together with the above-mentioned resin composition.

Then, the resin composition in the molten state obtained by this melting and kneading was transferred to the second extruder having a caliber of 65 mm, uniformly cooled to a temperature appropriate for extrusion expansion, and thereafter, extrusion expanded through a circular die having a caliber of 70 mm at a discharge amount of 30 kg/h to obtain a cylinder-like cylindrical expanded sheet.

The resulting cylindrical sheet was disposed along a φ 206 mm mandrel, the interior of which had been cooled with water at about 20° C., cooled and formed by blowing the air to an external surface thereof with an air ring larger than a diameter thereof, and incised with a cutter at one point on the circumference to obtain a belt-like biodegradable resin expanded sheet.

In addition, a temperature of an external surface of the cylindrical expanded sheet at a position at which 5 seconds had elapsed after being discharged from a discharge port was 68.7° C.

Example 2

In the same manner as that of Example 1 except that a discharge amount was 37 kg/h in the method for producing a biodegradable resin expanded sheet, a biodegradable resin expanded sheet was prepared.

In addition, a temperature of an external surface of the cylindrical expanded sheet at a position at which 5 seconds had elapsed after being discharged from a discharge port was 68° C.

Comparative Example 1

In the same manner as that of Example 1 except that a cylindrical expanded sheet surface temperature (temperature at a position at which 5 seconds had elapsed after being discharged from a discharge port) was 80.7° C., and the content of the blowing agent was 1.0% by mass in the method for producing a biodegradable resin expanded sheet, a biodegradable resin expanded sheet was prepared.

Comparative Example 2

In the same manner as that of Example 1 except that a cylindrical expanded sheet surface temperature (temperature at a position at which 5 seconds had elapsed after being discharged from a discharge port) was 76.8° C. in the method for producing a biodegradable resin expanded sheet, a biodegradable resin expanded sheet was prepared.

<Formability Assessment>

The biodegradable resin expanded sheet was thermoformed to obtain a bowl-shaped container, in which a height from a deepest part of a bottom in the container to a container opening is 4.9 cm, a diameter of an internal side of the container opening is 15.7 cm, and a diameter bottom caliber of an internal side of a container bottom is 14.5 cm.

A thickness of a bottom and a thickness of a sidewall of the above-mentioned container were measured, respectively, and a difference thereof was confirmed.

Determination of formability was performed as follows:
○: A difference in a wall thickness between a bottom and a sidewall is within a difference of 30%.
x: A difference in a wall thickness between a bottom and a sidewall is a difference of 30% or more.

The above assessment results are shown in Table 1.

TABLE 1

| | Temperature ° C. | Thickness mm | Basis weight g/m² | Apparent density kg/m³ | Open cell ratio % | Surface roughness (Ra) μm | Cell diameter (mm) | | | Average cell diameter | Formability |
|---|---|---|---|---|---|---|---|---|---|---|---|
| | | | | | | | MD | TD | VD | | |
| Example 1 | 68.7 | 1.38 | 547 | 400 | 10 | 4.3 / 3.2 | 0.42 | 0.45 | 0.24 | 0.36 | ○ |
| Example 2 | 68 | 1.61 | 556 | 350 | 8 | 4.6 / 3 | 0.34 | 0.45 | 0.23 | 0.33 | ○ |
| Comparative Example 1 | 80.7 | 1.8 | 546 | 300 | 9 | 2.5 / 4.1 | 0.45 | 0.52 | 0.2 | 0.36 | x |
| Comparative Example 2 | 76.8 | 1.47 | 558 | 380 | 9 | 3.5 / 2.2 | 0.42 | 0.52 | 0.21 | 0.36 | x |

* "Temperature" in Table is a temperature of a sheet external surface at a position at which 5 seconds have elapsed after being discharged from a discharge port.

As is also apparent from the above-mentioned table, according to the present invention, there is obtained a resin molded article that can easily retain a predetermined shape.

What is claimed is:

1. A method for producing a biodegradable resin expanded sheet, the method comprising:

melting and kneading a resin composition containing a biodegradable resin and a blowing agent with an extruder, and extrusion expanding the melted and kneaded resin composition in a molten state from a circular die having an annular discharge port to form a cylindrical expanded sheet;

sliding-contacting an external peripheral surface of a cooling mandrel having a diameter larger than that of said annular discharge port on an internal surface of said cylindrical expanded sheet to cool said cylindrical expanded sheet from an internal side while enlarging a diameter thereof; and cutting the cylindrical expanded sheet that has been subjected to diameter enlargement along an extrusion direction to develop the cylindrical expanded sheet, to obtain a flat belt-like expanded sheet, wherein said cylindrical expanded sheet is cooled so that a temperature of an external surface of said cylindrical expanded sheet at a position at which 5 seconds have elapsed after being discharged from said annular discharge port, and before being in sliding contact with the external peripheral surface of the cooling mandrel, becomes 50° C. or higher and 70° C. or lower.

2. The method for producing a biodegradable resin expanded sheet according to claim 1, wherein said biodegradable resin is an aliphatic polyester-based resin.

3. The method for producing a biodegradable resin expanded sheet according to claim 1, wherein said biodegradable resin is a resin containing dicarboxylic acid and diol as a constituent unit.

* * * * *